Dec. 7, 1937.      C. JACOBS      2,101,180
PORTABLE COOKER
Filed March 10, 1936      2 Sheets—Sheet 1
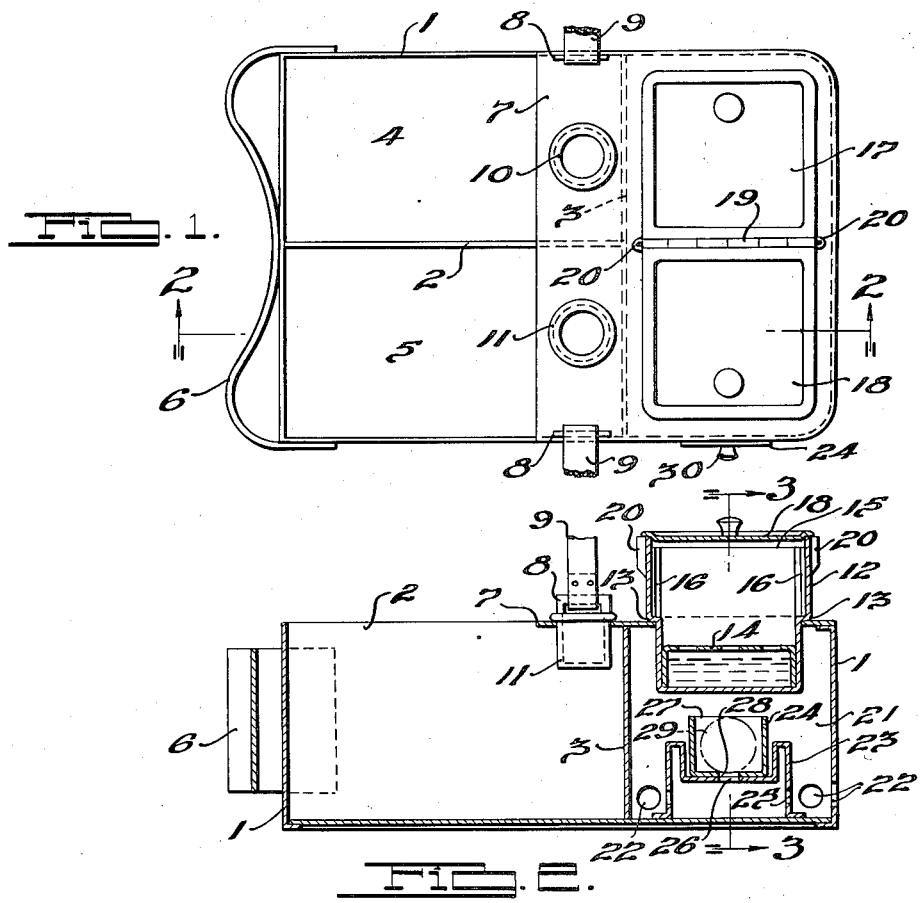
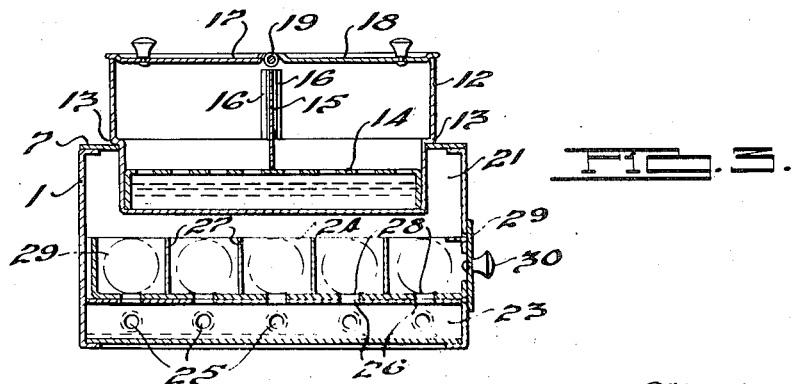
INVENTOR.
Charles Jacobs.
BY
Emerson B. Wisner
ATTORNEY.

Dec. 7, 1937.  C. JACOBS  2,101,180
PORTABLE COOKER
Filed March 10, 1936   2 Sheets-Sheet 2
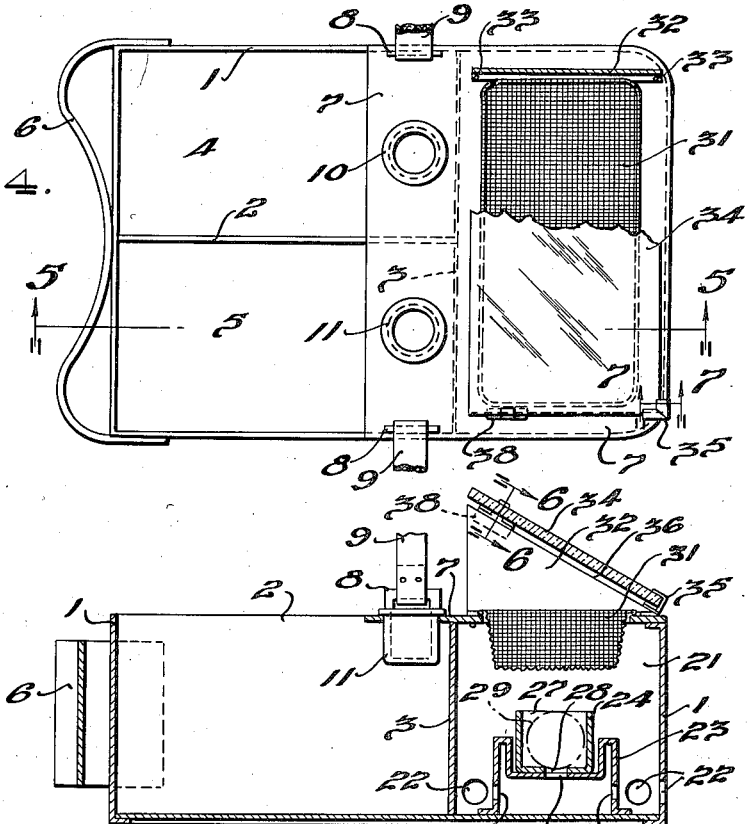
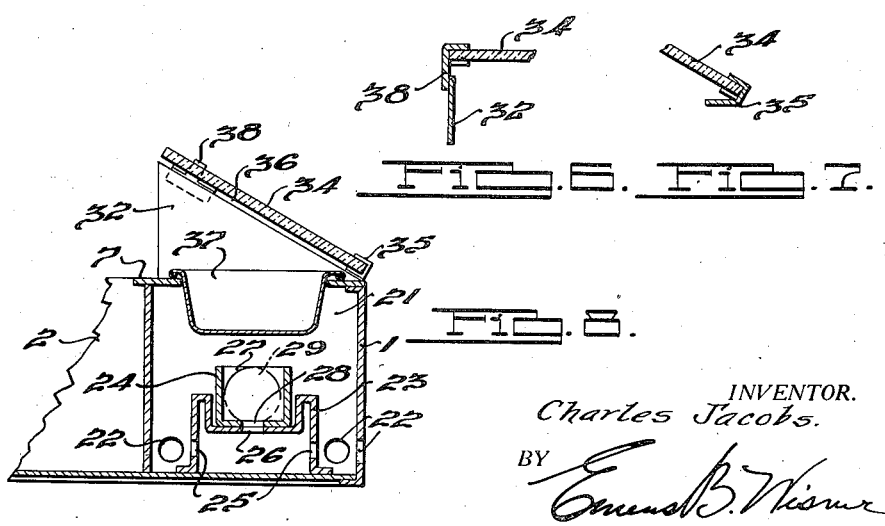
INVENTOR.
Charles Jacobs.
BY
ATTORNEY.

UNITED STATES PATENT OFFICE 2,101,180

PORTABLE COOKER

Charles Jacobs, Detroit, Mich.

Application March 10, 1936, Serial No. 68,122

3 Claims. (Cl. 126—261)

This invention relates to portable cookers and the object of the invention is to provide a portable cooker which may be used for steaming, broiling or frying foods.

Another object of the invention is to provide a portable cooker for use in dispensing foods through an audience and provided with straps whereby the cooker may be hung over the salesman's shoulders and provided with a body engaging portion so that the cooker may be carried in front of the salesman.

Another object of the invention is to provide a portable cooker having a cooking compartment and storage compartments for the foods to be cooked.

A further object of the invention is to provide a stove comprising a drawer in which the fuel is carried and the drawer being movable longitudinally to vary the draft to the fuel.

Another object of the invention is to provide a drawer having a series of compartments each arranged to hold a cake or block of fuel, the drawer being provided with an opening in the bottom of each compartment arranged to be moved into or out of alignment with openings in a support to vary the draft to the fuel.

A further object of the invention is to provide a portable cooker in which the steamer, broiler or fryer may be interchanged in the casing depending upon the type of cooking to be done.

These objects and the several novel features of the invention are hereinafter more fully described and claimed and the preferred form of construction by which these objects are attained is shown in the accompanying drawings in which—

Fig. 1 is a plan view of a portable cooker embodying my invention.

Fig. 2 is a section taken on line 2—2 of Fig. 1.

Fig. 3 is a section taken on line 3—3 of Fig. 2.

Fig. 4 is a plan view similar to Fig. 1 showing the steamer replaced with a broiler.

Fig. 5 is a section taken on line 5—5 of Fig. 4.

Fig. 6 is an enlarged section taken on line 6—6 of Fig. 5.

Fig. 7 is an enlarged section taken on line 7—7 of Fig. 4.

Fig. 8 is a fragmentary view similar to Fig. 5 showing the broiler replaced with a fryer.

The portable cooker comprises a substantially rectangular casing 1 divided into three compartments by means of the partition members 2 and 3 which are substantially T-shaped as shown. The partition 2 provides compartments 4 and 5 in which rolls, sausages or other foods to be dispensed may be kept. A body fitting member 6 is secured to one end of the rectangular casing and a cover member 7 is secured over the forward end of the casing. Brackets 8 are attached to opposite sides of the device and a strap 9 is secured to the brackets 8 and is adapted to be fitted about the shoulders of the wearer while the body fitting member 6 fits against his chest. Apertures are provided in the cover member 7 in which a mustard jar 10 and a horse radish jar 11 may be inserted and a rectangular aperture is also provided in the portion of the cover member 7 over the cooking compartment into which the steamer 12 may be inserted.

This steamer 12 is provided with a shoulder 13 resting on the edge of the cover member and a perforated false bottom member 14 is inserted in the steamer and water is provided in the steamer below the perforated partition 14. This member 14 may be lifted out of the steamer for washing. A transverse partition 15 shown more particularly in Fig. 3 is inserted in guides 16 in the steamer and rests on the member 14 and on the shoulders 13 of the steamer. A cover is provided for the steamer comprising the two lids 17 and 18 which are hinged together on the hinge 19 and the ends of the hinge pins are turned downwardly and fitted into brackets 20 provided on the exterior of the steamer as shown in Figs. 1 and 2. By this arrangement, the entire cover may be lifted off the steamer by lifting the pins out of the brackets 20 and at this time the partition 15 may be lifted out and the member 14 may be removed to allow the entire steamer to be washed inside and out.

The cooking compartment 21 forward of the partition 3 is provided with a series of apertures 22 to admit air to the compartment 21. As shown in Figs. 2 and 3, a sheet metal support member 23 is provided for the fuel drawer 24 and this member 23 is provided with apertures 25 in the side walls thereof adjacent the bottom and with a series of apertures 26 in the top horizontal wall thereof. The drawer 24 is formed of sheet metal and comprises a long narrow drawer provided with partitions 27 dividing the drawer into fuel compartments. Each of these fuel compartments is provided with an aperture 28 in the bottom which aligns with the apertures 26 in the support member 23 when the drawer is moved to the closed position shown in Fig. 3.

This portable cooker is especially suited for dispensing sausages and rolls, commonly known as "red hots", which are to be dispensed through an audience at a stadium or at any other large gathering. The person dispensing the food positions the strap 9 over his shoulders so that the formed portion 6 at the end of the cooker fits across the lower portion of his chest. A series of coke or charcoal briquettes 29 which have previously been ignited are positioned in the fuel compartments formed by the partitions 27 and the steamer is filled with the sausages. In the position shown in Figs. 2 and 3 the air will enter the heater compartment 21 through the openings 22 and thence will pass through the openings 25 in the support 23 and through the openings 26 and 28 to provide draft to the fuel. If the fuel begins to burn too hard, the draft may be decreased by pulling outwardly on the handle 30 of the drawer to bring the apertures 26 and 28 slightly out of alignment and reducing the openings through which the air may flow to the fuel or, if desired, the drawer may be pulled out until the apertures are completely out of alignment, at which time, no draft is provided to the fuel. One filling of fuel is usually sufficient to provide cooking heat until all of the sausages and rolls have been dispensed from the portable cooker, at which time, the cooker may be refilled with rolls and sausages and the drawer may be refilled with fuel briquettes. Fuel briquettes are the preferable fuel in that they may be obtained in standard sizes to fit the drawer compartments but suitable pieces of charcoal or other non-smoking fuel may be positioned in the drawer compartments.

An alternative form of the device is shown in Figs. 4 and 5. In this form of the device the casing is substantially the same as that shown in Figs. 1, 2 and 3 with the exception that the cooker in this case is a wire basket 31 provided with a rolled edge so that it may be positioned in the opening in the cover member 7 as shown in Fig. 5. In this device, the stove is the same as that shown in Figs. 2 and 3 and the sausages are positioned in the wire basket for broiling over the stove. In order to protect this open broiler from dust, dirt and foreign matter, a glass cover is preferably provided through which the contents may be seen by the prospective purchaser. This cover is formed by means of a pair of triangular sheet metal end supports 32 which are provided with pins 33 at the corners insertable through apertures provided in the cover member 7. Each bracket 32 carries a support 38 for the glass panel 34 as shown in Figs. 5 and 6 and at the lower end is provided with a supporting corner bracket 35 shown in Figs. 4, 5 and 7. By this arrangement the glass panel 34 is spaced above the edges of the brackets 32 providing a space 36 through which heat may escape and the heat may also escape through the open-side of the cover away from the prospective purchaser. This provides an arrangement whereby the sausages may be inspected by the prospective purchaser while broiling and, at the same time, guides the heat away from the customers.

Fig. 8 shows a modified form of the device in which a sheet metal pan 37 is positioned in the housing over the stove. This pan may be used for frying and allows the operator to cook hamburgers and other foods besides sausages in the pan 37.

When the portable cooker is in use, buns may be taken from the compartments 4 or 5 and the sausages may be positioned in the buns and by means of a suitable implement (not here shown) mustard or horse-radish may be spread on the sausages from the containers 10 and 11. If, at any time, the operator finds that the food is cooking too fast, he may simply draw the drawer out to reduce the draft to the fuel to the desired point or by drawing it out until the apertures 28 and 29 are out of alignment, may allow the fire to die.

Due to the fact that the steamer shown in Figs. 1, 2 and 3 will hold a large number of sausages while they are cooking, the compartments 4 and 5 are generally filled with buns. In the form of the device shown in Figs. 4, 5 and 6 only a small number of sausages can be cooked at one time in the receptacles 31 or 37. In this form of the device, either compartment 4 or 5 may be utilized for carrying additional sausages while the other compartment may be utilized for carrying the buns or rolls.

From the foregoing description it becomes evident that the device is very simple and efficient in operation, may be readily carried by the operator, provides a means of supplying hot food through a large crowd and provides a device which accomplishes the objects described.

Having thus fully described my invention, its utility and mode of operation, what I claim and desire to secure by Letters Patent of the United States is—

1. A portable cooker comprising a portable casing having a cooking compartment, a cover member extending over the cooking compartment and having a receptacle aperture, a cooking receptacle positioned in said receptacle aperture, a pair of triangular shaped brackets supported on the cover member at each end of the cooking receptacle, a glass panel supported in the said brackets over the cooking receptacle and extending at an angle from one edge of the cover member, a fuel drawer slidably mounted in the cooking compartment beneath the receptacle, a series of transverse partitions dividing the fuel drawer into fuel compartments each arranged to receive a piece of fuel, the bottom of said drawer being provided with an aperture in each compartment and a stationary support on which the fuel drawer is slidable provided with spaced apertures with which the apertures in the fuel drawer may be brought into or out of alignment and the casing wall about the cooking compartment being provided with air inlet apertures.

2. A portable cooker comprising a portable casing having a cooking compartment, a cover extending over the cooking compartment and having a rectangular aperture, a substantially rectangular cooking receptacle positioned in said aperture, a fuel drawer slidably mounted in the cooking compartment below the receptacle, a series of transverse partitions dividing the fuel drawer into fuel compartments each arranged to receive a piece of fuel, the bottom of said drawer being provided with a draft opening in each compartment and means for varying the draft openings of all compartments simultaneously.

3. A portable cooker comprising a casing having a cooking compartment, a drawer slidably mounted in the cooking compartment, the drawer being divided into fuel compartments and having an opening in the bottom of each fuel compartment, a supporting member in which the drawer is slidably mounted, the supporting member being provided with apertures arranged to align with the openings in the bottom of the drawer as the drawer is moved longitudinally of the support.

CHARLES JACOBS.